United States Patent
Luo et al.

(10) Patent No.: US 12,469,177 B2
(45) Date of Patent: Nov. 11, 2025

(54) METHOD FOR ACQUIRING A PREFERRED MEMORY COLOR OF OBJECT AND STANDARD COLOR CHART OF PREFERRED MEMORY COLOR

(71) Applicant: ZHEJIANG UNIVERSITY, Zhejiang (CN)

(72) Inventors: Ming Ronnier Luo, Hangzhou (CN); Mingkai Cao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 196 days.

(21) Appl. No.: 18/509,181

(22) Filed: Nov. 14, 2023

(65) Prior Publication Data

US 2024/0078708 A1    Mar. 7, 2024

Related U.S. Application Data

(63) Continuation of application No. PCT/CN2022/093123, filed on May 16, 2022.

(30) Foreign Application Priority Data

May 17, 2021   (CN) .......................... 202110535084.9

(51) Int. Cl.
*G06T 11/00* (2006.01)
*A61M 21/00* (2006.01)
(Continued)

(52) U.S. Cl.
CPC ............... *G06T 7/90* (2017.01); *A61M 21/00* (2013.01); *G06T 11/001* (2013.01); *A61M 2021/005* (2013.01); *G06T 2207/10024* (2013.01)

(58) Field of Classification Search
CPC ........ G06T 11/001; G06T 11/20; G06T 11/60; G06T 7/90; G06T 2207/10024;
(Continued)

(56) References Cited

U.S. PATENT DOCUMENTS 8,520,023 B2 * 8/2013 Sullivan ................ G06T 11/001
                                                        345/589
10,991,395 B1 * 4/2021 Shaburova ............... H04N 9/79
(Continued)

FOREIGN PATENT DOCUMENTS

CN          102509318 A        6/2012
CN          102934988 A        2/2013
(Continued)

OTHER PUBLICATIONS

International Search Report (PCT/CN2022/093123); Date of Mailing: Jul. 22, 2022.
(Continued)

*Primary Examiner* — Wesner Sajous
(74) *Attorney, Agent, or Firm* — Wiersch Law Group

(57) ABSTRACT

Disclosed is a method for acquiring a preferred memory color of an object and a standard color chart of the preferred memory color. The method comprises the following steps: collecting an original image of a target object with a representative memory color and a spectral reflectance distribution curve of a measured surface color of the target object; rendering the original image to acquire a group of experimental images; acquiring evaluation data of memory color preference of a subject based on the experimental images; obtaining a coordinate value of the preferred memory color; further, selecting a pigment combination of color patches according to the measured spectral reflectance distribution curve of a memory object, and acquiring a color formula of the color patches of the preferred memory color
(Continued)

in an experiment from the combination, so as to realize the acquisition of a memory color chart.

9 Claims, 11 Drawing Sheets

(51) Int. Cl.
*G06T 7/90* (2017.01)
*G09G 5/02* (2006.01)
*G09G 5/06* (2006.01)
*G09G 5/10* (2006.01)
*G09G 5/36* (2006.01)
*H04N 1/60* (2006.01)
*H04N 5/57* (2006.01)
*H04N 9/64* (2023.01)
*H04N 9/69* (2023.01)

(58) Field of Classification Search
CPC . G06T 200/24; G06T 200/20208; G06T 5/92; G06T 5/50; G06T 5/77; H04N 1/58; H04N 1/60; H04N 1/6019–6027; H04N 1/6077; H04N 5/202; H04N 5/57–58; H04N 9/64–79; H04N 17/02; A61M 21/00; A61M 2021/005; G01J 3/52; G01J 3/0251; G01J 3/463; A61B 5/00; G06V 10/56–60

See application file for complete search history.

(56) References Cited

U.S. PATENT DOCUMENTS

| | | | | |
|---|---|---|---|---|
| 11,284,013 B2* | 3/2022 | Lu | | H04N 1/6033 |
| 11,436,965 B2* | 9/2022 | Hwang | | H04N 21/422 |
| 2004/0004719 A1 | 1/2004 | Takada et al. | | |
| 2004/0135790 A1* | 7/2004 | Moore | | H04N 1/628 |
| | | | | 345/589 |
| 2017/0323460 A1 | 11/2017 | Carney et al. | | |

FOREIGN PATENT DOCUMENTS

| | | |
|---|---|---|
| CN | 106878705 A | 6/2017 |
| CN | 113259658 A | 8/2021 |
| JP | 2016006416 A | 1/2016 |

OTHER PUBLICATIONS

First Office Action(CN202110535084.9); Date of Mailing: Nov. 30, 2021.
Memory-Coloring-A-Compiler-Approach-for-Scratchpad-Memory-Management.
Evaluation-of-Memory-Colors-and-Subjective-Image-Quality-across-Cultures.

* cited by examiner

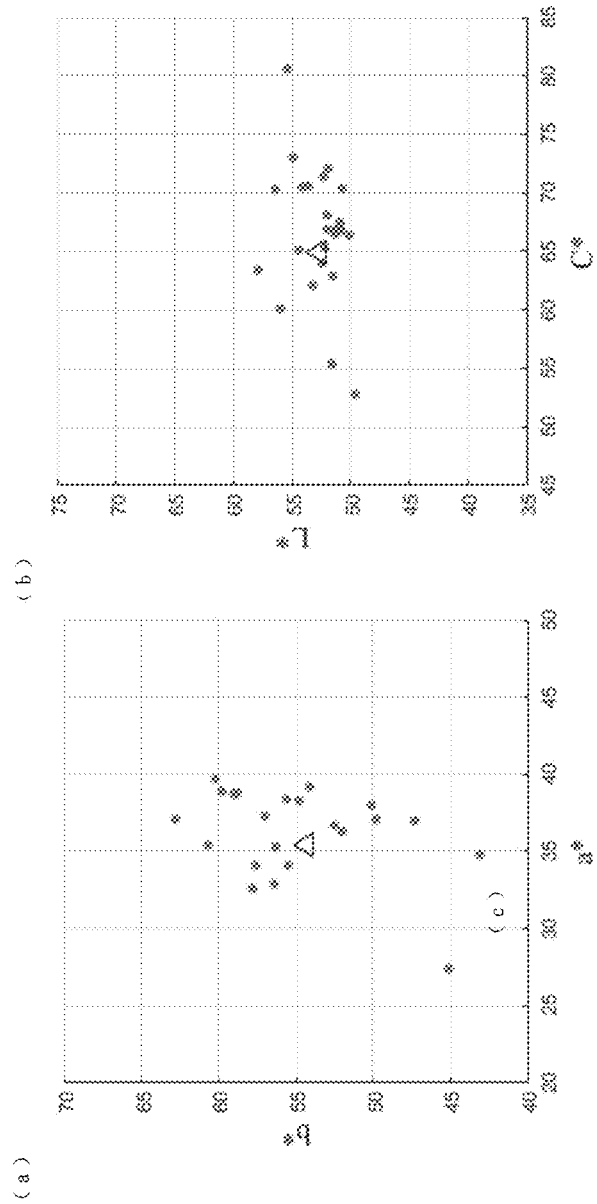
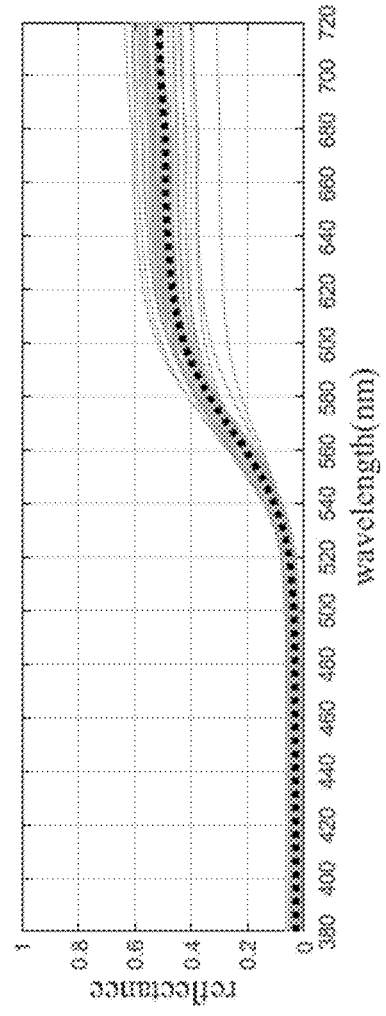
FIG. 4(A)
FIG. 4(B)
FIG. 4(C)

(a)

(b)

METHOD FOR ACQUIRING A PREFERRED MEMORY COLOR OF OBJECT AND STANDARD COLOR CHART OF PREFERRED MEMORY COLOR

CROSS-REFERENCE TO RELATED APPLICATIONS

The present application a continuation of International Application No. PCT/CN2022/093123, filed on May 16, 2022, which claims priority to Chinese Patent Application No. 202110535084.9, filed on May 17, 2021, the contents of both of which are incorporated herein by reference in their entireties.

TECHNICAL FIELD

The present disclosure belongs to the technical field of color and digital imaging, and in particular relates to a method for acquiring a preferred memory color of an object and a standard color chart of preferred memory color.

BACKGROUND

The X-Rite 24-color (standard) color chart is a tool used for image color quality inspection. It contains some natural colors and the main colors for color correction of image device, and is mainly used for image color reproduction, so that image engineers can regulate and evaluate the color accuracy displayed by different light sources. The standard 24 reference color after image processing can truly restore the color under the standard condition of D65/10° under any illumination and medium. Since its birth, X-Rite 24-color color chart has been regarded as the standard of various industries because of its excellent performance, the industries including photography, video, display, lighting, printing, graphic design, electronic publishing, and the like that correct and evaluate colors. However, among the 24 color patches, some are the colors of real natural objects, while other color patches are the important colors of image device color correction. In addition, these color patches are mainly used to accurately restore the color of natural objects, while ignoring the influence of memory color preference on color evaluation. In the field of digital picture display, it is an important standard to measure the accuracy of color reproduction that people are familiar with the memory color of objects. Therefore, memory colors of familiar objects for people are important standards to measure the accuracy of color reproduction. However, the preferred memory color of a familiar object in people's mind is not the same as the real surface color of this object, and there could be a big difference. Hence, adjusting the color of the memory color object to the preferred color range of the user can significantly improve the quality of digital pictures. In order to reproduce the high-quality object colors that are more familiar for users, it is of great application value and important practical significance to design and make a standard color chart based on preferred memory colors.

SUMMARY

The present disclosure aims at overcoming the defects in the prior art, and provides a method for acquiring a preferred memory color of an object and a standard color chart of the preferred memory color. The acquisition method is a representative memory color selection solution, and provides a method of combining the instrument measurement of the surface color of a object with the results of psychophysical visual experiments. The color chart obtained by this method can be used in illumination quality evaluation, photo quality evaluation, display quality evaluation, and other fields.

The specific technical solution adopted by the present disclosure is as follows:

In a first aspect, the present disclosure provides a method for acquiring a preferred memory color of an object, which is as follows:

S1, acquiring a color corrected original image of a target object and a spectral reflectance distribution curve of a surface color of the target object.

S2, rendering the original image to obtain a plurality of experimental images in L*a*b* space, wherein the color indexes of all experimental images are covered within a set range, and the colors of the experimental images are able to reflect the color of the target object.

S3, acquiring evaluation data of the memory color preference based on the experimental images, wherein the evaluation data comprises a preference rate $P_v$ of a number of subjects for each of the experimental images.

S4, obtaining a coordinate value of the preferred memory color by using an elliptical memory color model according to the evaluation data, wherein the ellipsoid memory color model is configured to establish a relationship between the evaluation data and the coordinates of memory colors of the experimental images in color space, so as to obtain a preferred memory color ellipsoid, and a center point of the preferred memory color ellipsoid is the coordinate value of the preferred memory color.

S5, adjusting a color coordinate value of a color patch to be consistent with the coordinate value of the preferred memory color, and adjusting the spectral reflectance distribution curve of the color patch to be consistent with a shape characteristic of the spectral reflectance distribution curve of the surface color of the target object.

S6, taking the color of the color patch as the acquired preferred memory color of the target object.

In an embodiment, the original image is a captured image or an existing image; the light environment presented by the existing image is a D65 standard light source; an illumination source for the captured image during capturing is a D65 standard light source, the illumination source is perpendicular to the surface of the target object; there is an angle of 45° between capturing light and a plane where the target object is located, and a camera is in a manual mode.

In an embodiment, in S3, the evaluation data is obtained by conducting a psychophysical experiment test on the subject.

In an embodiment, the spectral reflectance distribution curve is measured by a contact spectrophotometer.

In an embodiment, in S3, the experimental images are displayed to the subjects through a display device, and the display device has been corrected by using a three-dimensional color lookup table method.

In an embodiment, in S2, an average L*a*b* value of pixel colors of the target object is taken as a rendering starting point of the original image, and a rendering process is performed on the original image.

In an embodiment, the elliptical memory color model comprises Formula (1) and Formula (2), The Formula (1) is $$P_c = \frac{1}{1 + e^{(\Delta E' - a)}} \quad (1)$$

The Formula (2) is $$\Delta E' = \sqrt{\begin{array}{c} k_1(L^* - L_0^*)^2 + k_2(a^* - a_0^*)^2 + k_3(b^* - b_0^*)^2 + \\ k_4(L^* - L_0^*)(a^* - a_0^*) + k_5(L^* - L_0^*)(b^* - b_0^*) + \\ k_6(a^* - a_0^*)(b^* - b_0^*) \end{array}} \quad (2)$$

where $P_c$ is a calculated preference rate obtained through the evaluation data; $\Delta E'$ is a color difference between the preferred memory color and a color in the experimental images; a parameter $\alpha$ is a $\Delta E'$ value corresponding to a preference rate of 50%; $k_1$, $k_2$, $k_3$, $k_4$, $k_5$ and $k_6$ represent parameters corresponding to the elliptic memory color model, respectively; $L^*_0$, $a^*_0$, and $b^*_0$ represent the coordinates of the preferred memory color in a CIELAB color space; $L^*$, $a$ and $b^*$ represent the coordinates of the memory color in the CIELAB color space in the experimental images.

A correlation coefficient R is calculated by using the calculated preference rate $P_c$ obtained by the Formula (1) and the preference rate $P_v$, and a value of R (correlation coefficient) is maximized to obtain the coefficients in the Formula (1) and the Formula (2).

In an embodiment, the color indexes comprise CIELAB values of a lightness $L^*$, a red-green $a^*$, a yellow-blue $b^*$, a chroma $C^*_{ab}$, a hue angle $h_{ab}$ and a spectral reflectance distribution curve.

In a second aspect, the present disclosure provides a standard color chart of a preferred memory color, wherein a color patch to be optimized in a target color chart is optimized according to the method of any one of the first aspect, and the preferred memory color obtained after optimization is taken as the color of the color patch.

Compared with the prior art, the present disclosure has the following beneficial effects:

1) The present disclosure adopts the method of combining the instrument measurement of the surface color of an object with the visual experiment of psychophysics, and formulates the standard color chart of the preferred memory color for image capturing and displaying color correction. The innovative highlight of the present disclosure is to provide a tool for color reproduction and restoration in color industry. At present, the technical problem to be solved is that besides the traditional accurate restoration, the most important thing is to achieve the preferred memory restoration. Therefore, the present disclosure can make up for the deficiency of the current common color charts in the market by providing a color patch and colorimetric chart based on memory colors. The present disclosure has strong operability, provides the color coordinates of 24 color patches, and different copied versions have a smaller color difference.

2) The application scope of the present disclosure includes: evaluating the accurate restoration quality of color correction models of photographic, display, printing and scanning device; evaluating the memory preference restoration quality of the color model of the above image device; evaluating or enhancing the color processing effects such as white balance, color gamut mapping and the like in the above image device; evaluating the accuracy or preference of color rendering and reduction characteristics of lighting sources; providing the CIELAB coordinate value and color inversion rate of each color, which is convenient for users' operation or calculation.

BRIEF DESCRIPTION OF DRAWINGS

FIGS. 4(A), 4(B) and 4(C) are respectively the color coordinate data (a and b) and spectral reflectance distribution curve (c) of a sample (orange) according to an embodiment of the present disclosure.

DESCRIPTION OF EMBODIMENTS

Figures 1, 2:
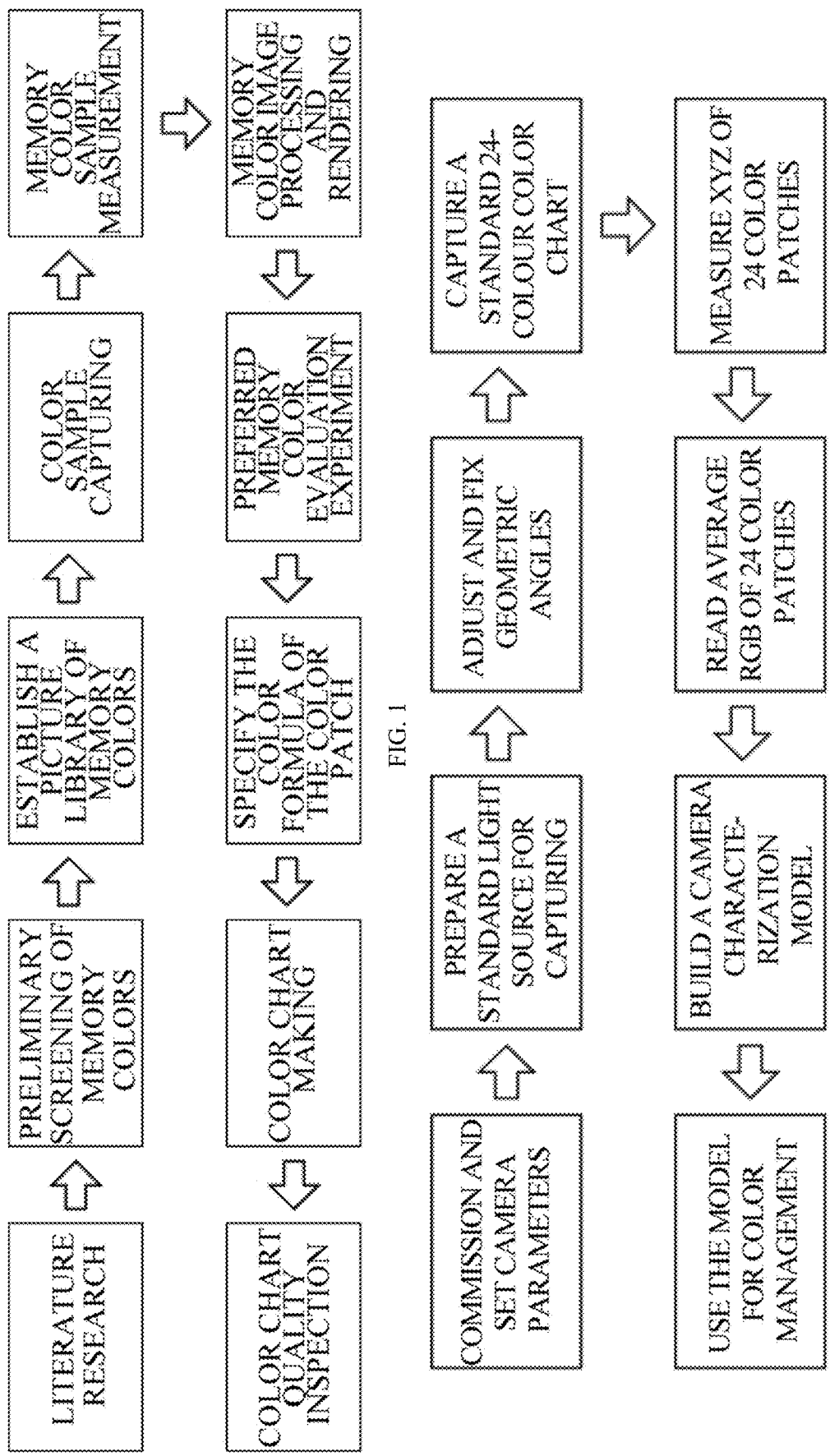
FIG. 1 is a design flow chart of a color chart according to an embodiment of the present disclosure.
FIG. 2 is a flowchart of establishing a camera characterization model according to an embodiment of the present disclosure.

The present disclosure will be further illustrated and explained with reference to the drawings and specific embodiments below. The technical features of each embodiment of the present disclosure can be combined accordingly without mutual conflict.

The present disclosure provides a method for acquiring a preferred memory color of an object. By acquiring the preferred memory color of any target object by this method, the color of the object can be adjusted to the preferred color range of a user, the quality of digital pictures can be significantly improved, and this method can also play a guiding role in the fields of illumination quality evaluation, photo quality evaluation, display quality evaluation and the like. The method for acquiring the preferred memory color of an object is as follows:

S1: Firstly, an original image of the target object is collected. The original image of the object can be obtained by purchasing the real object and capturing it on the spot, or a color corrected image with a prominent main body, a simple background, a complete and beautiful shape, natural colors, clear imaging and excellent image quality can be selected from the existing image library.

If the original image is a captured image (that is, it is obtained through on-spot capturing), the following conditions should be met during capturing: the lighting source during capturing is a D65 standard analog light source, the lighting source is perpendicular to the surface of the target object, and the capturing light is at 45 degrees to the plane of the target object; at the same time, it is best to use a SLR camera, which should be adjusted to the manual mode. In the manual mode, the white balance of the camera is turned off, and the camera's own image processing module is turned off. The captured image obtained by the above capturing method can better reflect the color of the target object.

If the original image is an existing image, that is, the image in the existing image library is directly used, the light environment presented in the original image should be selected to be close to a D65 standard simulated light source. The existing images can provide materials that can be used for optimization for objects that are difficult to capture in an indoor environment with fixed lighting.

Secondly, the spectral reflectance distribution curve of the surface color of the target object is obtained, which can be measured by a contact spectrophotometer. During measurement, in order to avoid a large random error caused by a single sampling point, a contact spectrophotometer can be used to measure a number of different points on the surface of the target object in the spectral mode without a light source, and the average value of all points measured can be taken as the measurement result of the target object.

S2, the original color corrected image obtained in S1 is rendered, so as to obtain a plurality of experimental pictures which can reflect the colors of the target object. Firstly, the average value of the pixel colors of the target object is taken as the rendering starting point of the original image. If the image is selected from the image library, the RGB value of each pixel is converted into a tristimulus value at CIE 1964 10° viewing angle by a display characterization model. If it is an image obtained by photographing, the RGB value of each image is converted into a XYZ tristimulus value by a camera characterization model. Finally, the XYZ tristimulus values are converted into color coordinates in a CIELAB color space. Then the average value of the original image is rendered to get a number of pictures needed for the experiment. The colors of all experimental pictures are different, and the coordinates of each color in the color space change within a certain range around the color coordinates of the original image in the directions of lightness, saturation and hue angle, thus ensuring that the rendered experimental pictures are not only within a reasonable range of colors, but also covered on different color indexes, so as to obtain all similar pictures with only different colors from the original image and within a reasonable range of colors as much as possible.

S3, based on the experimental images obtained in the step S2, the evaluation data of the memory color preference of each experimental image is obtained, wherein the evaluation data includes the preference rate of the subject for each experimental image. In practical application, the evaluation data can be obtained by conducting psychophysical experiments on the subject, that is to say, firstly, the display device is corrected by the three-dimensional color lookup table method, then all the experimental images are displayed to the subject on the corrected display device, and the subject is asked to give preference evaluation on the memory colors in each experimental image, so as to obtain the preference rate of the subject for each experimental image.

S4, according to the evaluation data obtained in step 3, the coordinate values of the preferred memory color are obtained by using an elliptical memory color model. Previous research experience shows that the distribution shape of most allowable memory colors on the plane is an ellipse. Therefore, the relationship between the evaluation data and the coordinates of the memory color of the experimental image in a color space is established through the ellipsoid memory color model, and then the preferred memory color ellipsoid is obtained, and the center point of the preferred memory color ellipsoid is the coordinate value of the preferred memory color.

In this embodiment, the elliptical memory color model can take the following form, that is, it includes formula (1) and formula (2). The correlation coefficient (R) is calculated by using the calculated preference rate $P_c$ obtained by formula (1) and the visual preference rate Pv obtained by the experiment, and the value of R is optimized to maximize the value of R, so as to obtain the coefficients in formulas (1) and (2).

The formula (1) is:

$$P_c = \frac{1}{1 + e^{(\Delta E' - a)}} \quad (1)$$

The formula (2) is:

$$\Delta E' = \sqrt{\begin{array}{l} k_1(L^* - L_0^*)^2 + k_2(a^* - a_0^*)^2 + k_3(b^* - b_0^*)^2 + \\ k_4(L^* - L_0^*)(a^* - a_0^*) + k_5(L^* - L_0^*)(b^* - b_0^*) + \\ k_6(a^* - a_0^*)(b^* - b_0^*) \end{array}} \quad (2)$$

where $P_c$ is a calculated preference rate obtained through the evaluation data; $\Delta E'$ is a color difference between the preferred memory color and a color in the experimental images; a parameter $\alpha$ is a $\Delta E'$ value corresponding to a preference rate of 50%; $k_1$, $k_2$, $k_3$, $k_4$, $k_5$ and $k_6$ represent parameters related to the elliptic memory color model; $L^*_0, a^*_0, b^*_0$ represent the coordinates of the preferred memory color in a CIELAB color space; $L^*, a^*, b^*$ represent the coordinates of the memory color in the CIELAB color space in the experimental images. There are six weighted summed fitting terms in the root of the above formula (2), each of which is composed of one or two of three factors of $L^*-L^*_0$, $a^*-a^*_0$, $b^*-b^*_0$. The first three terms are the squares of the above three factors themselves, and the last three terms are the pairwise products of two different factors of the above three. The elliptical memory color model thereof has a good prediction effect.

Of course, the number of the six fitting terms and the composition format of each fitting term in the root of the above formula (2) can also be adjusted according actual requirements, depending on the prediction effect of the final preferred memory color. Generally, when constructing the fitting terms in the root of the above formula (2), each of the fitting terms can be composed of one or two of three factors of $L^*-L^*_0$, $a^*-a^*_0$, $b^*-b^*_0$. When one factor is selected, the square thereof is adopted, and when two factors are selected, the pairwise product of the two are adopted. For example, in another embodiment, only the first two fitting terms in the above formula (2) can be kept, which is equivalent to $\Delta E' = \sqrt{(k_1+k_2+k_3+k_4+k_5)(L^*-L^*_0)^2 + k_2(a^*-a_0^*)^2}$. However, in order to ensure the prediction effect of the elliptical memory color model, a recommended manner according to the present disclosure is that: the fitting terms in the root of the above formula (2) include at least two different terms in a square format of a single factor, together with another term in a pairwise product format of two factors. Each fitting term in the square format of the single factor is the square of one factor itself of the above three, and each fitting term in the pairwise product format of the two factors is the pairwise product of the two different factors of the above three.

S5, the pigment formula of the color patches is formulated, that is, by adjusting the addition ratio of each color pigment, the color coordinate values of the obtained color patch are consistent with those of the preferred memory color, and the spectral reflectance distribution curve of the color patch is consistent with the shape characteristics of the spectral reflectance distribution curve of the surface color of the target object. That is to say, under the condition of ensuring that the color coordinate value of the color patch is as close as possible to the coordinate value of the preferred memory color of the corresponding object, the shape of the spectral reflectance distribution curve of the color patch is consistent with the shape of the real spectral reflectance distribution curve of the surface color of the target object, thus optimizing the optimal pigment formula of the color patch.

S6, the color patch made by the color formula in step S5 is taken as the acquired preferred memory color of the target object.

In a practical application, the above method can be used to optimize some color patches in the existing color chart, that is, the memory color obtained by the above method is used as the color of the color patch, and then the whole color chart after optimization is obtained. According to the above method, the preferred memory colors of a plurality of target objects can be acquired respectively, and then the acquired memory color patches are combined with the color patches in the existing color chart to obtain a standard color chart with the required number of color patches, such as a 24-color standard color chart, a 36-color standard color chart and the like.

The above method will be described in detail in the following embodiment, and the specific process of this embodiment is shown in FIG. 1.

Embodiment

Step 1: screening a target memory color, which was specifically as follows:

From nearly 60 literatures about memory colors, nearly 43 kinds of memory color objects with the highest research frequency were counted, and the colors of these objects were converted from different color spaces to the CIELAB color space under CIE D65 and 1964 standard colorimetric observer conditions according to their respective research light environments and media. The colors of all objects were drawn on the CIELAB a*b*, a*L*, b*L*planes respectively, and 16 memory color objects whose color coordinates were as evenly distributed as possible were selected from the pictures, so as to ensure the color distribution in each quadrant of the color coordinates. At the same time, the situation that many representative objects had very similar color coordinates was avoided. Finally, 16 memory color objects whose color coordinates were distributed as evenly as possible were selected, including African skin color, South Asian skin color, East Asian skin color, Caucasian skin color, pork, strawberry, carrot, orange, banana, green apple, grassland, Smurfs, blue sky, Pepsi, lavender and purple cabbage.

Step 2: establishing a memory color picture library, which was specifically as follows:

Since the memory color objects selected in step 1 include those that are difficult to capture and measure in an indoor environment with fixed lighting (such as grass, Smurfs, blue sky and lavender), the images with a prominent subject, a simple background, a complete and beautiful object shape, natural colors, clear imaging and excellent image quality were directly selected from the existing library as the original images of the objects. The light environment presented in the selected picture needed to be close to a CIE D65 standard light source. The original images of these difficult-to-photograph objects were obtained by screening directly from the existing library, so as to establish a memory color picture library.

Step 3: capturing and measuring the surface color of the selected memory color object, which was specifically as follows:

For the object whose memory color object selected in step 1 could be directly photographed in the indoor environment with fixed lighting, the following two methods were adopted to obtain the original image of the corresponding object, which was as follows:

Method 1): Caucasian, East Asian, South Asian and African models were photographed, close-up photos of the faces of the four models were taken under a standard D65 light source with an illumination of 1000 lux by using a digital camera that had been accurately corrected by the color model, and the pictures were taken as the original image of each object. The method of camera correction is shown in FIG. 2 (that is, converting the RGB values of the pictures taken by the camera into XYZ tristimulus values).

Figure 3:
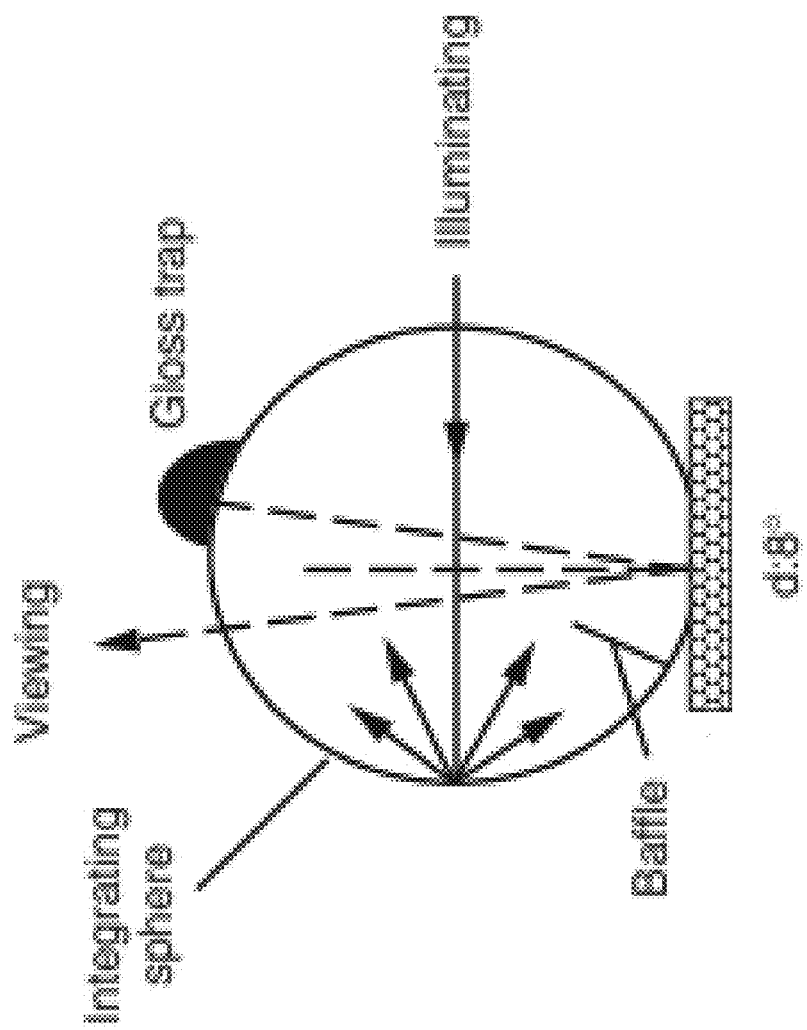
FIG. 3 shows the geometric relationship used for sample capturing according to an embodiment of the present disclosure.

By using a Minolta CM700d spectral reflectance meter, the spectral reflectance of the facial skin color of the model was measured in contact with the geometric condition of di:8°. The geometric relationship of di:8° used in the measurement was shown in FIG. 3. The color measurement conditions were large aperture, including specular light, and removing ultraviolet light. In order to avoid a large random error caused by a single sampling point, a contact spectrophotometer was used to measure the skin surface of each model at different points, and the real surface color data of the sample was obtained, and finally the spectral reflectance distribution curve of the skin color of each model was obtained.

Method 2): memory color samples with a fresh quality and bright colors were collected. In this embodiment, six memory color samples (including pork, carrot, orange, banana, green apple and purple cabbage) were obtained.

The dust on the surface of all physical samples were wiped off t with wet wipes, and then the sample surfaces were dried for later use. Under the standard D65 light source with an illumination of 1000 lux, the samples were placed in the center of a neutral gray light box. The geometric conditions of sample capturing were 0°:45°. The geometric relationship of 0°:45° used in the measurement is that: the illumination source was perpendicular to the surface of the sample to be measured, and the capturing light was at 45° to the plane of the sample to be measured. The photos of the experimental samples were taken by using an SLR camera in a manual mode, and the exposure time was set to 1/60s, the aperture value was set to f/5.6, the ISO speed was set to 200, the fixed focal length was set to 24 mm, and the camera capturing distance was set to 30 cm. The still life pictures were taken as the original images of each object.

Multi-point contact measurement of different positions on the surface of each sample was carried out by using a contact spectrophotometer in a spectral mode without a light source, and the real surface color data of the sample was obtained, and finally the spectral reflectance distribution curve of each sample was obtained.

Figure 5B:
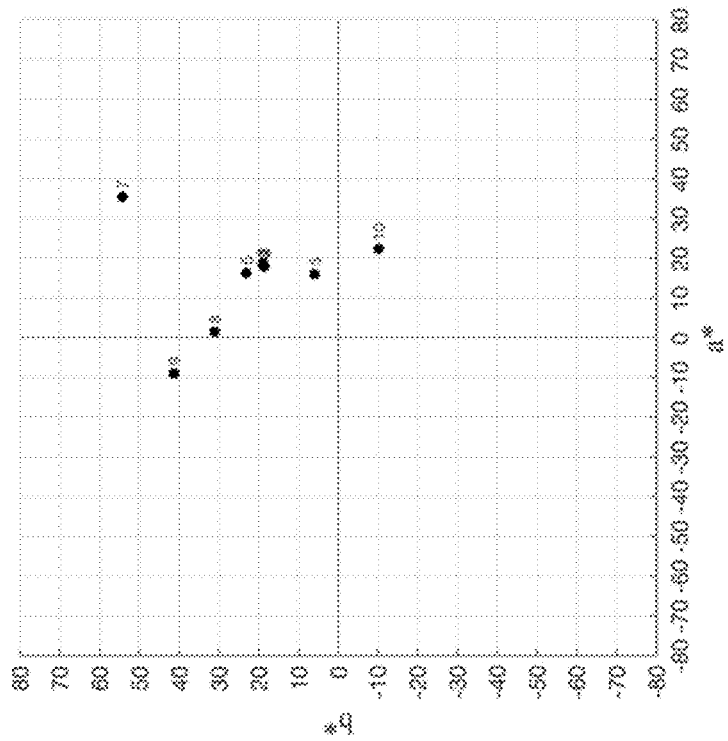
FIGS. 5(A) and 5(B) show the color coordinate distribution of all samples in a CIELAB color space according to an embodiment of the present disclosure.
Figure 5A:
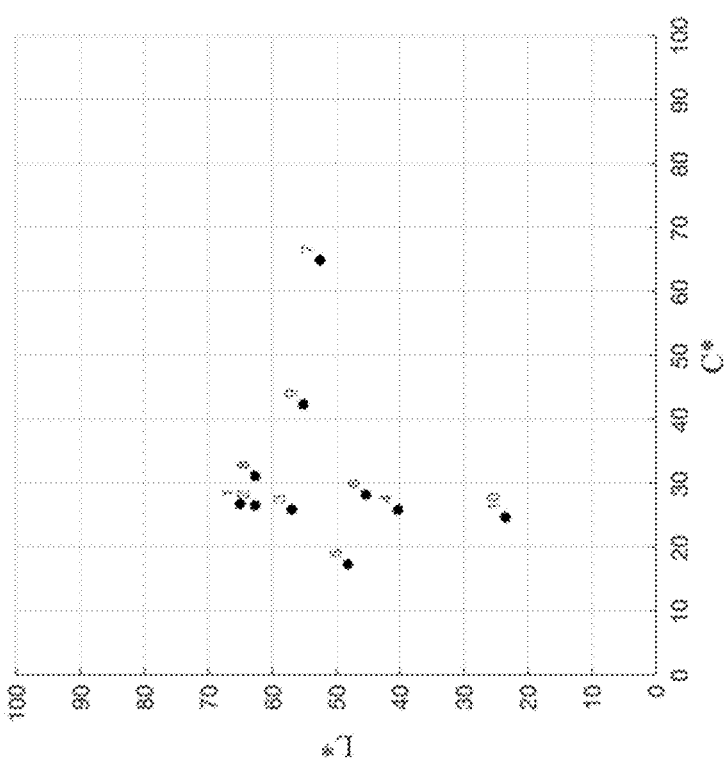

As shown in FIG. 4(a) and FIG. 4(b), it is the color coordinate data of sampling points of the orange sample. In the figure, the solid points are the color coordinate data of 40 sampling points, and the triangular points are the average results. In FIG. 4(c), the solid gray line shows the spectral distribution curve of each sampling point of the sample, and the dotted black line shows the average spectral distribution curve of all sampling points. FIG. 5 shows the color coordinate distribution of 10 samples (Caucasian, East Asian, South Asian, African, pork, carrot, orange, banana, green apple and purple cabbage) in the CIELAB color space.

Step 4: performing image processing on the obtained original image, which was specifically as follows:

Due to the limitation of season, location and capturing conditions, there were 14 original images in total, which were selected from the memory color library, in addition to the purchased memory color samples taken on the spot.

Figures 6, 7:
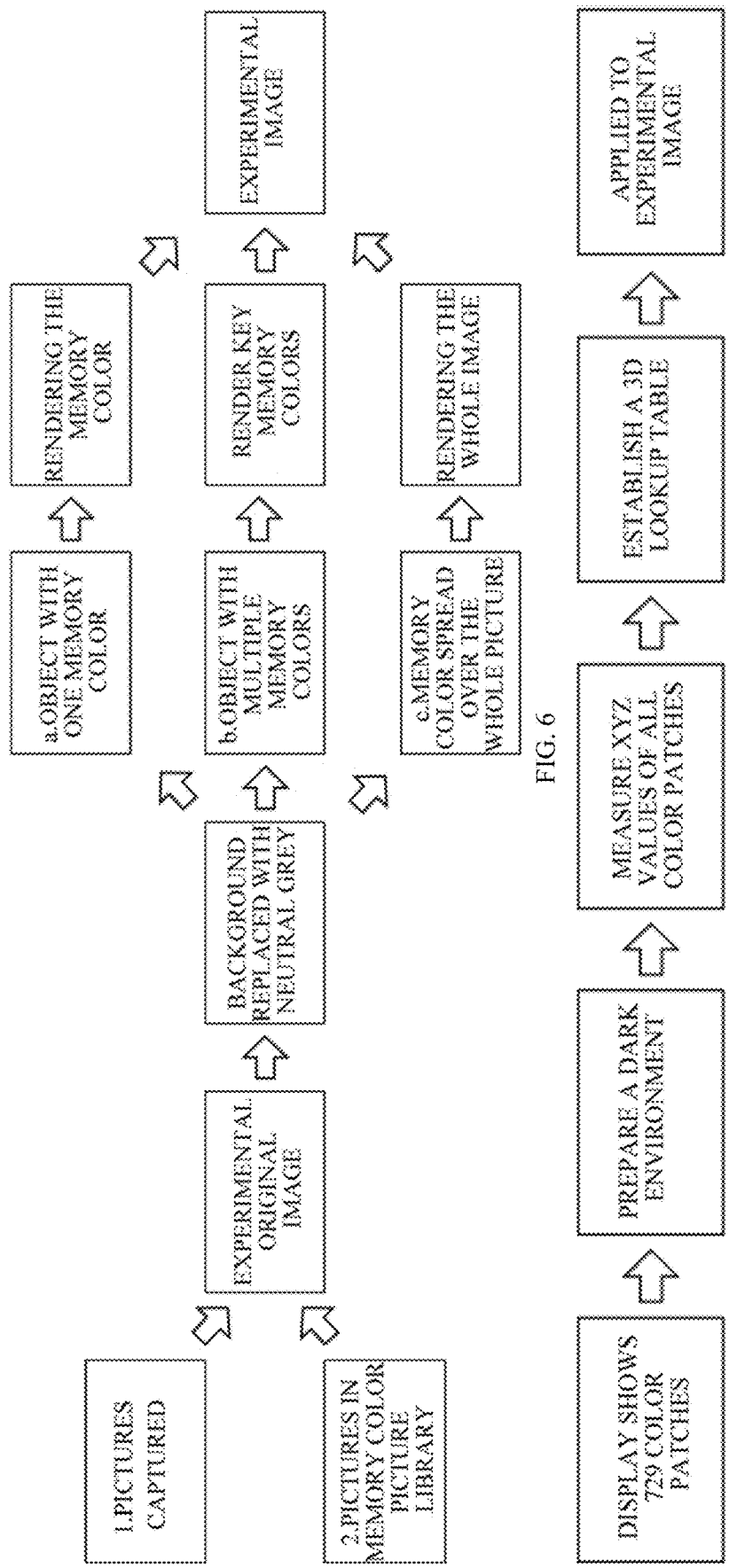
FIG. 6 is the processing and rendering flow of experimental images according to an embodiment of the present disclosure.
FIG. 7 is a flow chart of correcting the display device by the three-dimensional color lookup table method according to an embodiment of the present disclosure.

As shown in FIG. 6, the original image was processed, wherein, the first kind of pictures contained the following memory color objects: the skin colors of Africans, South Asians, East Asians and Caucasians, as well as oranges, bananas, green apples, purple cabbage, carrots and pork; the second kind of pictures contained the following memory color objects: blue sky, grass, Smurfs, lavender; pictures of class a contained the following memory color objects: oranges, bananas, green apples, purple cabbage and carrots; pictures of class b contained the following memory color objects: Caucasian skin color, East Asian skin color, South Asian skin color, African skin color, pork and lavender; pictures of class c contained the following memory color objects: blue sky and grass. Part of the image memory color object was cut out, and the background was replaced with uniform neutral gray. A three-dimensional color look-up table method was used to establish a characterization model for the display device used in the experiment, so as to facilitate the color correction of the display device. FIG. 7 shows a flowchart of establishing a display characterization model.

Figure 8:
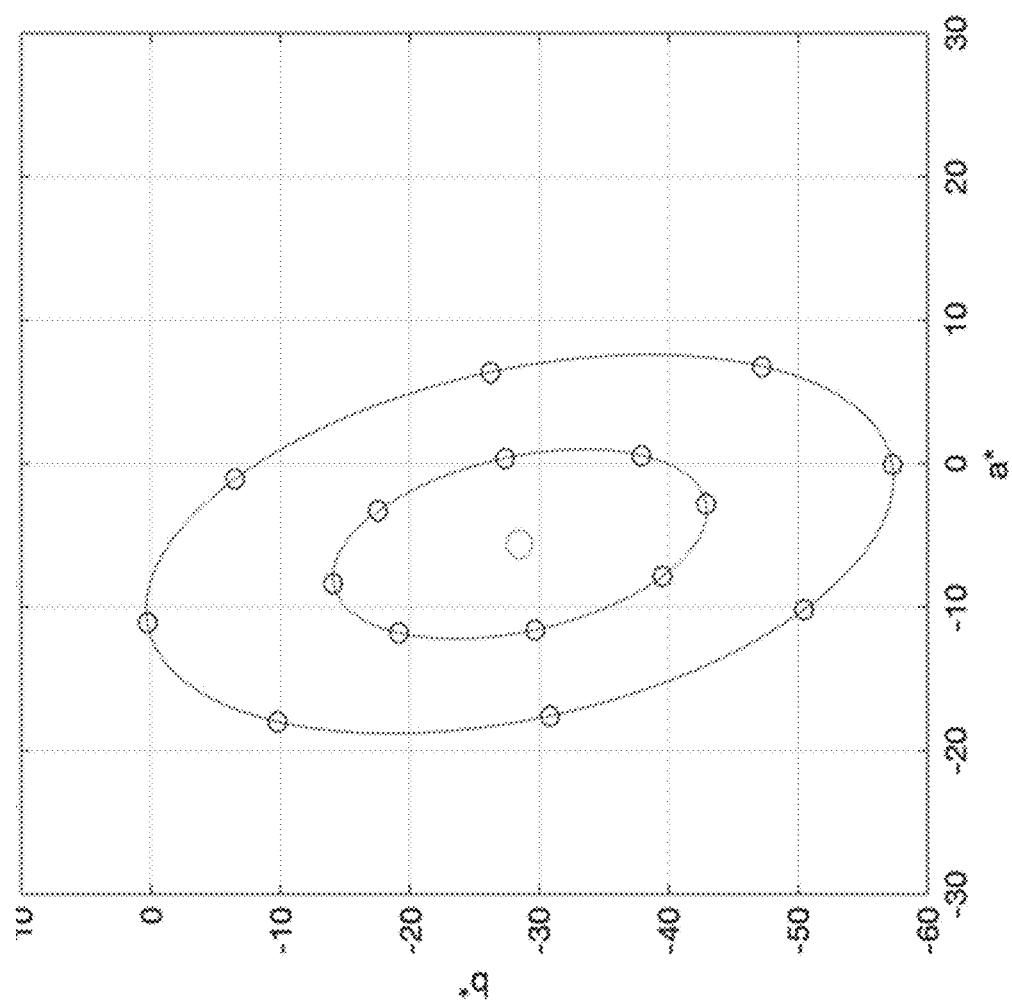
FIG. 8 is a schematic diagram of taking points during rendering of experimental images according to an embodiment of the present disclosure.

The above original images were rendered respectively, as shown in FIG. 8, and two layers of ellipses with the same center, the semi-major axis and the semi-minor axis changing by 2 times were taken on the a*b*, a*L*, b*L* planes of the CIELAB color space. A point was taken every 45° on each ellipse, and there were 8×2=16 points on each plane. In addition, the original image was considered as the origin. In the CIELAB space, a total of 16×3+1 (original image)=49 points with different L*a*b* color coordinates were taken. These 49 coordinate points changed in a certain range around the color coordinates in the directions of lightness, chroma and hue angle, which ensured that the rendered pictures were covered on different color indexes within a reasonable range of colors. At last, each original image was rendered to get 49 similar images with only different colors and within a reasonable color range, that is, 490 experimental images (10×49) were obtained.

Figure 9:
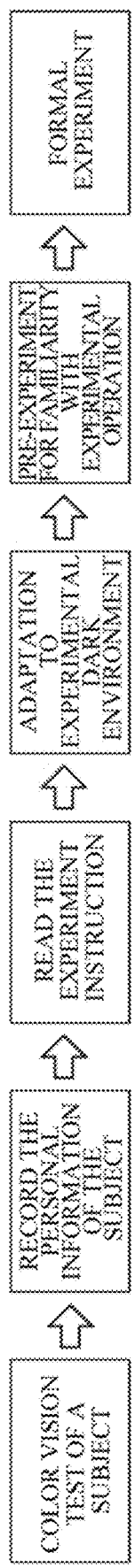
FIG. 9 is the flow arrangement of a psychophysics experiment test according to an embodiment of the present disclosure.

Step 5: conducting psychophysical experiments, which was as follows:

A large number of experimental images obtained by rendering were displayed on a strictly calibrated display device. 50 subjects were recruited for evaluation of the preference of memory colors in all experimental images. The experiment was conducted in a completely dark environment, and the subjects only needed to judge the color of the object in the picture "like" or "dislike" on their mobile phones. The experimental arrangement is shown in FIG. 9. In this psychophysics experiment, a total of 50×10×49=24,500 judgments were made, and finally the evaluation data about the preference rate of each experimental image was obtained.

According to the obtained evaluation data, the relationship between the evaluation data and the coordinates of the memory colors of the experimental image in the color space was established by using the ellipsoid memory color model, and the preferred memory color ellipsoid was obtained. Then, the coordinate value of the preferred memory color was obtained by calculating the center point of the preferred memory color ellipsoid. The calculation method is as follows.

The correlation coefficient R was calculated by using the preference rate $P_c$ calculated in formula (1) and the preference rate $P_v$, and the value of R was maximized to obtain the coefficients in formulas (1) and (2). The elliptical memory color model comprises a formula (1) and a formula (2), The formula (1) according to the embodiment is $$P_c = \frac{1}{1 + e^{(\Delta E' - a)}} \quad (1)$$

The formula (2) according to the embodiment is $$\Delta E' = \sqrt{\begin{array}{l} k_1(L^* - L_0^*)^2 + k_2(a^* - a_0^*)^2 + k_3(b^* - b_0^*)^2 + \\ k_4(L^* - L_0^*)(a^* - a_0^*) + k_5(L^* - L_0^*)(b^* - b_0^*) + \\ k_6(a^* - a_0^*)(b^* - b_0^*) \end{array}} \quad (2)$$

where $P_c$ is a calculated preference rate obtained through the evaluation data; $\Delta E'$ is a color difference between the preferred memory color and a color in the experimental images; a parameter $\alpha$ is a $\Delta E'$ value corresponding to a preference rate of 50%; $k_1$, $k_2$, $k_3$, $k_4$, $k_5$ and $k_6$ represent parameters related to the elliptic memory color model; $L^*_0, a^*_0, b^*_0$ represent the coordinates of the preferred memory color in a CIELAB color space; $L^*, a^*, b^*$ represent the coordinates of the memory color in the CIELAB color space in the experimental images. There are six fitting terms in the root of the above formula (2) according to the embodiment, each of which is composed of one or two of the three factors of $L^* - L^*_0$, $a^* - a^*_0$, $b^* - b^*_0$. The first three terms are the squares of the three factors themselves, and the last three terms are the pairwise products of the above three factors. It should be noted that in other embodiments, the six different fitting terms can also be deleted according to requirements. For example, only the first two fitting terms in the above formula (2) according to the embodiment are kept. However, for the sake to acquire better prediction of the preferred memory color, the above implement manner with six different fitting terms is adopted.

Figure 10A:
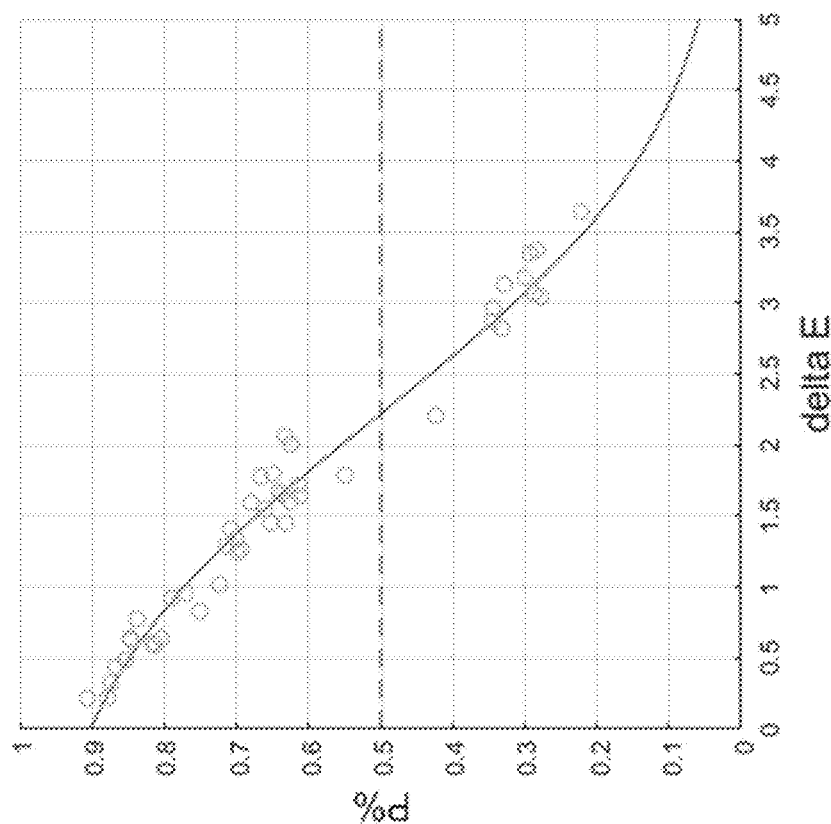
FIGS. 10(A) and (B) show the prediction effect of an elliptical memory color model according to an embodiment of the present disclosure, in which a shows the comparison between the predicted preference rate of the model and the actual preference rate of the experiment, and b shows the distribution of the predicted model and the actual data points.
Figure 10B:
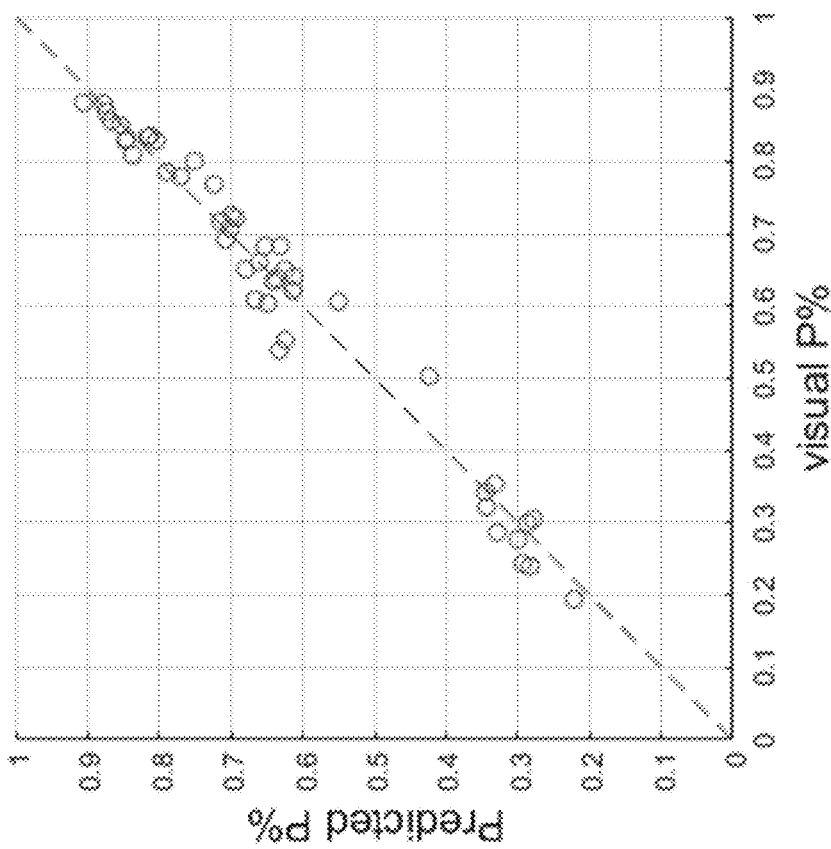
Figure 11:
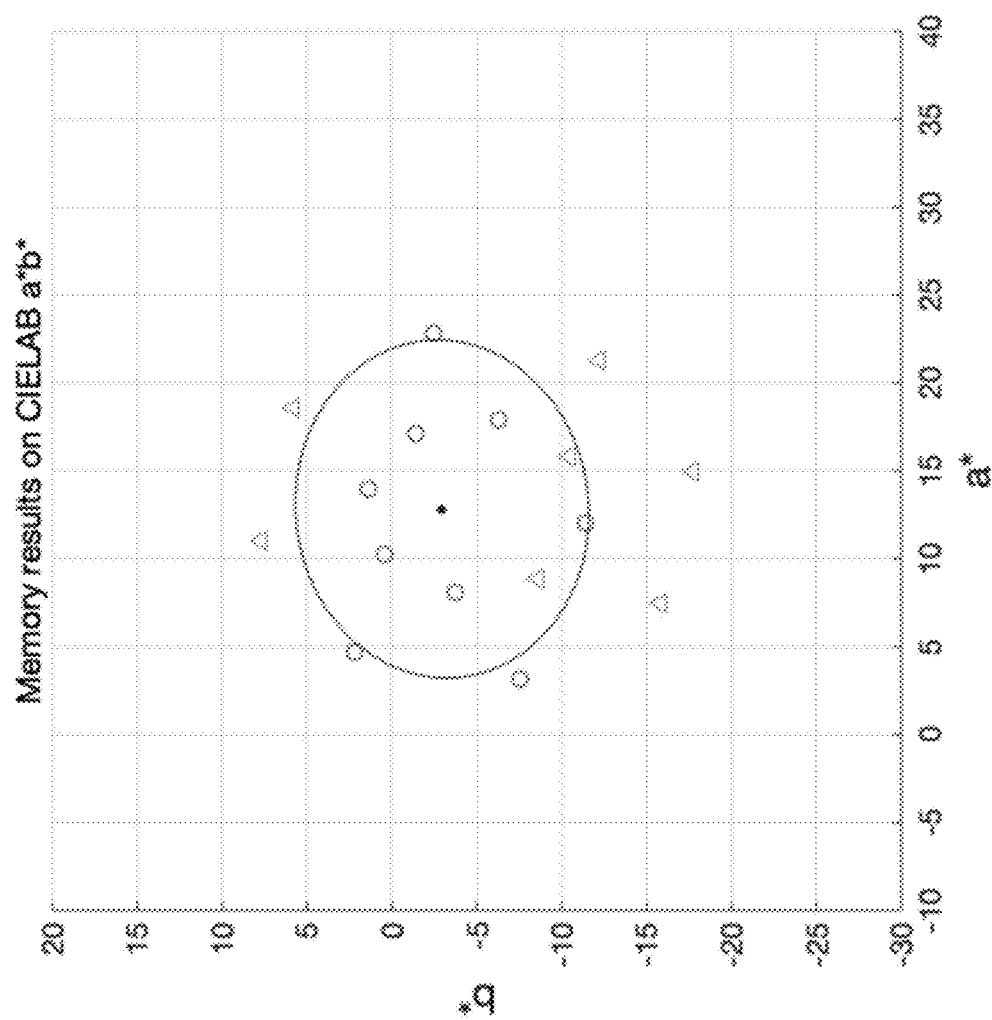
FIG. 11 is a preferred memory color ellipse obtained by an elliptical memory color model according to an embodiment of the present disclosure.

When $\Delta E' = \alpha$, the value of P=50%. This means that half of the subjects like the memory color on the ellipsoid, that is, the memory color inside the ellipsoid is liked by most people, while the memory color outside the ellipsoid is disliked by most people. FIG. 10 shows the prediction effect of an elliptical memory color model, and FIG. 11 shows the preferred memory color ellipse obtained by the elliptical memory color model, in which the circle represents the memory color with a preference rate higher than 50%, and the triangle represents the memory color with a preference rate lower than 50%.

Step 6, formulating a pigment formula of the color patches, which was specifically as follows:

From the surface color reflectance obtained in step 3, a color combination realized by color patches was obtained by computer color matching software, and then the same pigment combination was adjusted by the memory color coordinate values ($L^*_0, a^*_0, b^*_0$) obtained in step 5 to realize the color patch of object color. The color patch had a small color difference with the target object, and the spectral reflectance distribution curves of the color patch and the surface color of the target object have the same characteristics.

Figure 12A:
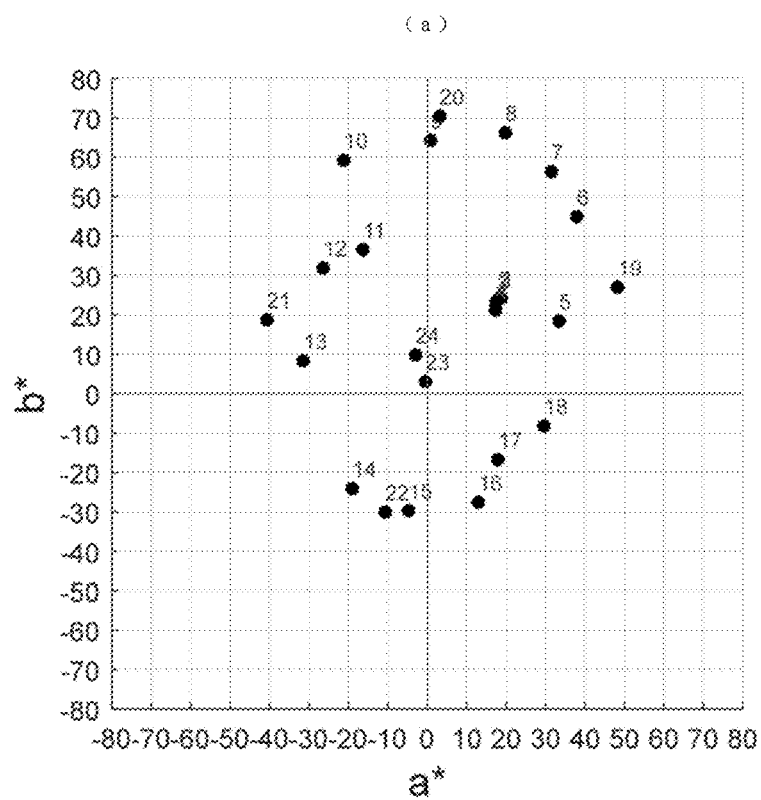
FIGS. 12(A) and 12(B) show the color coordinate distribution of 24 memory color patches in a CIELAB color space obtained according to an embodiment of the present disclosure.
Figure 12B:
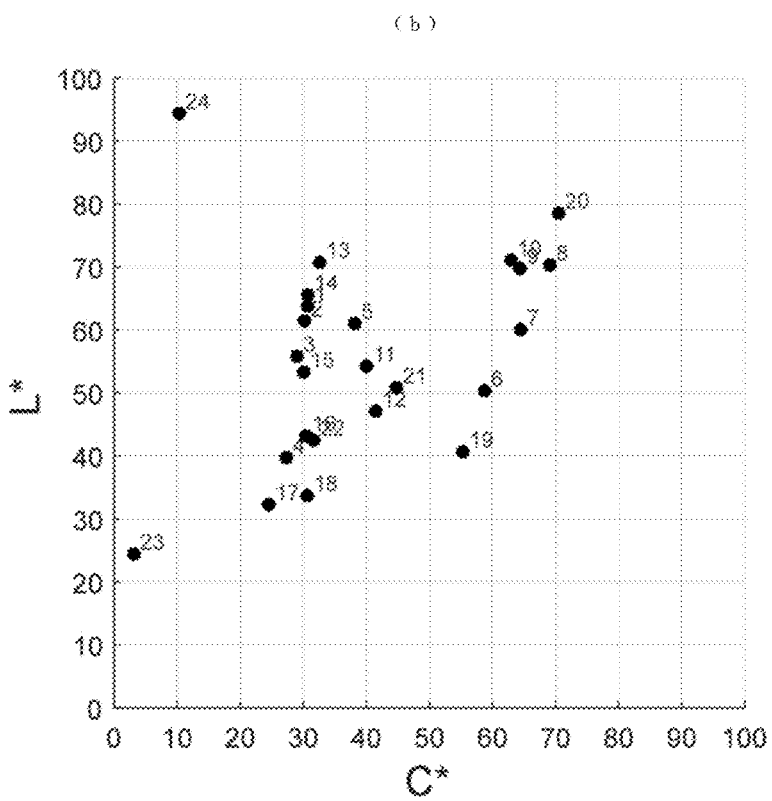
Figure 13:
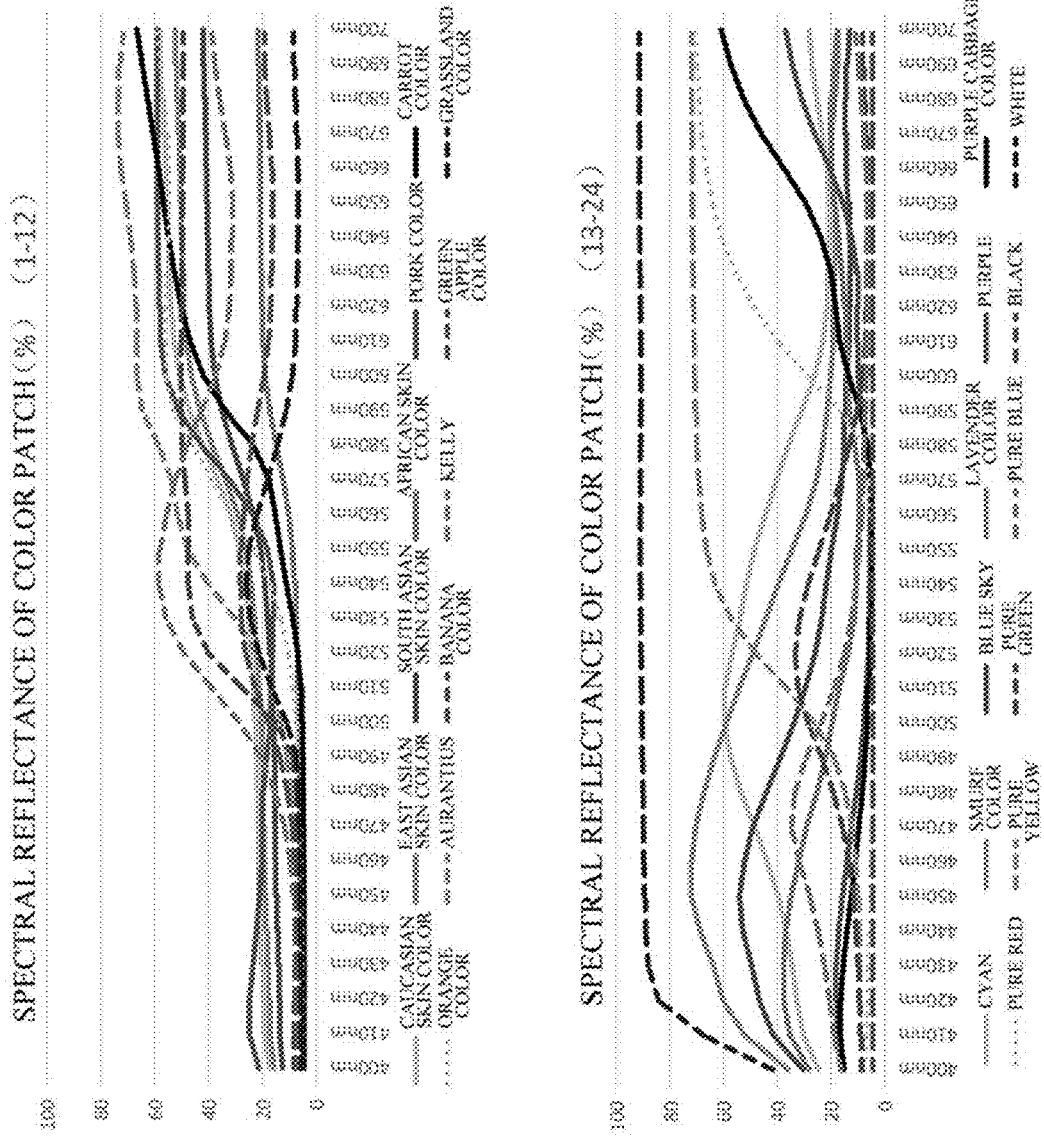
FIG. 13 shows the spectral reflectance distribution of 24 memory color patches obtained according to an embodiment of the present disclosure.

Step 7: making a 24-color colorimetric chart, which was specifically as follows:

From all the acquired 24 memory colors obtained above, all the selected color patches shall be distributed in each of the coordinates of the color space as much as possible. As shown in FIG. 12, the 24 color patches were evenly distributed on the a*b* plane of CIELAB color space, wherein, 10 colors were the memory colors obtained from the above experiments. The six color patches were selected to represent the complementary colors of three pairs of vision: red-green, yellow-blue, black-white (19, 20, 21, 22, 23, 24); four colors were selected from colors 8, 10, 13, and 17 (No. 12 Orange Yellow, No. 11 yellow green, No. 6 bluish green, and No. 10 purple) to fill in the colors that could not be covered. Table 1 shows the measured partial spectral reflectance of surface colors of all 24 memory color at different wavelengths, Table 2 shows the color data of each color patch in the obtained 24-color colorimetric chart, and FIG. 13 shows the spectral reflectance distribution of 24 memory color patches obtained in the embodiment.

TABLE 1

Spectral reflectance of the experimental sample multiplied by 100(%) (1-8)

| | No. | | | | | | | |
|---|---|---|---|---|---|---|---|---|
| | 1 | 2 | 3 | 4 | 5 | 6 | 7 | 8 |
| Color patch object name | Cau-casian skin color | East Asian skin color | South Asian skin color | African skin color | Pork color | Carrot color | Orange color | Auran-tius |
| 400 nm | 17.42 | 15.77 | 12.73 | 5.43 | 21.53 | 4.72 | 5.34 | 6.88 |
| 410 nm | 19.48 | 17.40 | 13.69 | 5.54 | 25.02 | 4.67 | 5.34 | 7.01 |
| 420 nm | 19.96 | 17.83 | 13.97 | 5.67 | 24.91 | 4.65 | 5.37 | 7.02 |
| 430 nm | 20.36 | 18.27 | 14.30 | 5.87 | 23.57 | 4.66 | 5.45 | 7.05 |
| 440 nm | 21.01 | 18.90 | 14.81 | 6.10 | 22.36 | 4.71 | 5.58 | 7.17 |
| 450 nm | 21.54 | 19.43 | 15.22 | 6.23 | 21.18 | 4.78 | 5.76 | 7.39 |
| 460 nm | 21.76 | 19.61 | 15.36 | 6.26 | 20.29 | 4.85 | 6.02 | 7.79 |
| 470 nm | 21.90 | 19.75 | 15.46 | 6.31 | 20.18 | 4.98 | 6.49 | 8.43 |
| 480 nm | 22.10 | 19.92 | 15.59 | 6.38 | 19.83 | 5.10 | 6.98 | 9.58 |
| 490 nm | 22.40 | 20.23 | 15.84 | 6.53 | 18.56 | 5.24 | 7.32 | 11.05 |
| 500 nm | 22.94 | 20.76 | 16.28 | 6.75 | 17.06 | 5.49 | 7.77 | 13.32 |
| 510 nm | 23.63 | 21.43 | 16.83 | 7.03 | 16.56 | 5.97 | 8.71 | 16.61 |
| 520 nm | 24.40 | 22.21 | 17.47 | 7.37 | 16.40 | 7.05 | 10.60 | 22.16 |
| 530 nm | 25.32 | 23.10 | 18.21 | 7.75 | 15.95 | 8.90 | 13.48 | 30.37 |
| 540 nm | 26.60 | 24.34 | 19.25 | 8.26 | 16.14 | 11.33 | 17.39 | 40.35 |
| 550 nm | 28.57 | 26.22 | 20.82 | 9.04 | 18.31 | 13.47 | 23.40 | 47.94 |
| 560 nm | 31.93 | 29.33 | 23.46 | 10.40 | 23.67 | 15.39 | 31.74 | 51.69 |
| 570 nm | 36.71 | 33.75 | 27.20 | 12.47 | 32.39 | 17.70 | 38.87 | 53.84 |
| 580 nm | 42.21 | 38.80 | 31.46 | 15.03 | 42.80 | 23.66 | 46.06 | 58.75 |
| 590 nm | 47.22 | 43.31 | 35.19 | 17.43 | 51.40 | 33.99 | 53.20 | 64.76 |
| 600 nm | 50.79 | 46.48 | 37.76 | 19.14 | 56.12 | 42.04 | 55.97 | 66.75 |
| 610 nm | 52.94 | 48.33 | 39.19 | 20.09 | 57.96 | 46.96 | 56.06 | 66.75 |
| 620 nm | 54.09 | 49.29 | 39.93 | 20.51 | 58.54 | 50.28 | 55.64 | 67.00 |
| 630 nm | 54.79 | 49.86 | 40.33 | 20.72 | 58.79 | 52.84 | 55.23 | 67.76 |
| 640 nm | 55.31 | 50.24 | 40.58 | 20.82 | 58.88 | 55.01 | 54.93 | 69.02 |
| 650 nm | 55.78 | 50.58 | 40.82 | 20.91 | 58.96 | 56.83 | 54.89 | 70.77 |
| 660 nm | 56.24 | 50.94 | 41.04 | 21.05 | 58.96 | 58.69 | 55.11 | 72.69 |
| 670 nm | 56.88 | 51.44 | 41.38 | 21.24 | 59.04 | 60.72 | 55.74 | 73.69 |
| 680 nm | 57.52 | 51.95 | 41.75 | 21.48 | 59.10 | 62.73 | 56.65 | 73.48 |

TABLE 1-continued

Spectral reflectance of the experimental sample multiplied by 100(%) (1-8)

| | No. | | | | | | | |
|---|---|---|---|---|---|---|---|---|
| | 1 | 2 | 3 | 4 | 5 | 6 | 7 | 8 |
| Color patch object name | Cau-casian skin color | East Asian skin color | South Asian skin color | African skin color | Pork color | Carrot color | Orange color | Auran-tius |
| 690 nm | 58.19 | 52.48 | 42.11 | 21.74 | 59.13 | 64.75 | 57.90 | 72.87 |
| 700 nm | 58.83 | 52.97 | 42.43 | 21.97 | 59.10 | 66.72 | 59.41 | 71.63 |

TABLE 1

Spectral reflectance vof the experimental sample multiplied by (9-16)

| | No. | | | | | | | |
|---|---|---|---|---|---|---|---|---|
| | 9 | 10 | 11 | 12 | 13 | 14 | 15 | 16 |
| Color patch object name | Ba-nana color | Kelly | Green apple color | Grass-land color | Cyan | Smurf color | Blue sky | Lav-ender color |
| 400 nm | 8.41 | 7.09 | 6.74 | 5.55 | 24.65 | 35.90 | 30.38 | 28.12 |
| 410 nm | 8.37 | 7.35 | 6.93 | 5.66 | 30.42 | 52.29 | 41.63 | 35.34 |
| 420 nm | 8.09 | 7.49 | 7.01 | 5.78 | 32.85 | 60.37 | 46.83 | 37.72 |
| 430 nm | 7.87 | 7.71 | 7.12 | 5.96 | 34.56 | 64.00 | 49.67 | 37.82 |
| 440 nm | 7.63 | 8.06 | 7.30 | 5.14 | 36.79 | 68.90 | 53.00 | 35.99 |
| 450 nm | 7.44 | 8.68 | 7.63 | 6.22 | 39.69 | 72.32 | 54.30 | 35.03 |
| 460 nm | 7.35 | 9.88 | 8.21 | 6.28 | 43.82 | 72.10 | 52.40 | 32.13 |
| 470 nm | 7.36 | 11.96 | 9.15 | 5.43 | 48.60 | 70.71 | 49.30 | 29.23 |
| 480 nm | 7.58 | 15.64 | 10.96 | 5.55 | 53.68 | 67.53 | 44.25 | 25.31 |
| 490 nm | 8.85 | 20.69 | 13.69 | 7.58 | 57.55 | 63.73 | 38.99 | 22.14 |
| 500 nm | 15.15 | 28.85 | 18.07 | 11.21 | 59.93 | 59.18 | 33.93 | 19.58 |
| 510 nm | 28.04 | 39.12 | 22.84 | 16.75 | 59.73 | 54.48 | 29.72 | 17.06 |
| 520 nm | 40.19 | 49.26 | 26.43 | 21.45 | 57.03 | 49.29 | 26.02 | 13.72 |
| 530 nm | 46.11 | 55.93 | 28.12 | 24.64 | 54.14 | 44.52 | 23.55 | 11.34 |
| 540 nm | 47.68 | 58.60 | 28.46 | 26.18 | 51.72 | 39.82 | 21.81 | 10.58 |
| 550 nm | 47.57 | 58.09 | 28.00 | 25.18 | 48.67 | 34.68 | 19.90 | 10.21 |
| 560 nm | 47.69 | 55.72 | 27.08 | 22.07 | 44.65 | 29.48 | 17.66 | 9.41 |
| 570 nm | 48.91 | 52.34 | 25.83 | 18.27 | 40.53 | 25.50 | 15.94 | 9.45 |
| 580 nm | 49.97 | 47.96 | 24.13 | 14.57 | 36.17 | 23.06 | 15.05 | 11.15 |
| 590 nm | 50.30 | 42.67 | 21.92 | 11.33 | 31.04 | 21.52 | 14.59 | 13.19 |
| 600 nm | 50.31 | 37.56 | 19.58 | 9.02 | 26.20 | 20.21 | 14.02 | 14.12 |
| 610 nm | 50.20 | 34.04 | 17.85 | 7.82 | 23.01 | 19.17 | 13.36 | 14.42 |
| 620 nm | 50.08 | 32.37 | 16.99 | 7.31 | 21.54 | 18.71 | 12.95 | 14.96 |
| 630 nm | 50.01 | 31.72 | 16.66 | 7.10 | 21.00 | 18.52 | 12.88 | 15.97 |
| 640 nm | 49.88 | 31.25 | 16.39 | 6.96 | 20.71 | 18.55 | 13.08 | 17.24 |
| 650 nm | 49.79 | 31.14 | 16.34 | 6.93 | 20.69 | 19.11 | 13.64 | 18.63 |
| 660 nm | 49.66 | 32.00 | 16.73 | 7.11 | 21.53 | 20.01 | 14.42 | 19.85 |
| 670 nm | 49.63 | 33.93 | 17.63 | 7.56 | 23.32 | 20.36 | 14.79 | 19.89 |
| 680 nm | 49.55 | 36.04 | 18.60 | 8.11 | 25.34 | 19.84 | 14.52 | 18.68 |
| 690 nm | 49.51 | 37.83 | 19.36 | 8.61 | 27.10 | 18.92 | 13.90 | 17.56 |
| 700 nm | 49.40 | 38.96 | 19.82 | 8.95 | 28.24 | 17.71 | 13.09 | 15.94 |

TABLE 1

Spectral reflectance of the experimental sample multiplied by 100(%) (17-24)

| Color patch object name | 17 Purple | 18 Pwple cabbage color | 19 Pure red | 20 Pure yellow | 21 Pure green | 22 Pure blue | 23 Black | 24 White |
|---|---|---|---|---|---|---|---|---|
| 400 nm | 15.76 | 15.19 | 7.68 | 8.82 | 8.56 | 16.19 | 4.41 | 41.71 |
| 410 nm | 17.79 | 16.60 | 6.98 | 9.20 | 9.17 | 18.90 | 4.39 | 67.73 |
| 420 nm | 18.28 | 16.40 | 6.27 | 9.29 | 9.56 | 20.72 | 4.37 | 84.44 |
| 430 nm | 18.08 | 15.54 | 5.72 | 9.40 | 10.03 | 22.64 | 4.35 | 88.40 |
| 440 nm | 17.21 | 14.07 | 5.29 | 9.63 | 10.72 | 25.03 | 4.34 | 89.35 |
| 450 nm | 15.77 | 12.48 | 4.99 | 10.07 | 11.73 | 28.10 | 4.34 | 89.82 |
| 460 nm | 14.08 | 10.94 | 4.77 | 10.86 | 13.39 | 32.36 | 4.32 | 90.11 |
| 470 nm | 12.48 | 9.70 | 4.64 | 12.15 | 15.70 | 35.69 | 4.33 | 90.23 |
| 480 nm | 10.52 | 8.32 | 4.52 | 14.74 | 19.21 | 34.80 | 4.33 | 90.39 |
| 490 nm | 8.97 | 7.30 | 4.49 | 18.83 | 23.44 | 30.64 | 4.33 | 90.60 |
| 500 nm | 7.79 | 6.57 | 4.44 | 26.25 | 28.57 | 24.78 | 4.34 | 90.74 |
| 510 nm | 6.88 | 5.97 | 4.43 | 36.52 | 32.38 | 19.52 | 4.34 | 90.97 |
| 520 nm | 6.03 | 5.30 | 4.49 | 48.00 | 33.37 | 15.45 | 4.34 | 91.15 |
| 530 nm | 5.54 | 4.90 | 4.53 | 57.24 | 31.87 | 12.63 | 4.35 | 91.23 |
| 540 nm | 5.43 | 4.84 | 4.50 | 63.32 | 28.63 | 10.72 | 4.36 | 91.34 |
| 550 nm | 5.41 | 4.87 | 4.63 | 66.57 | 24.52 | 9.43 | 4.36 | 91.33 |
| 560 nm | 5.37 | 4.89 | 5.05 | 68.32 | 20.34 | 8.49 | 4.36 | 91.27 |
| 570 nm | 5.64 | 5.20 | 5.73 | 69.48 | 16.58 | 7.81 | 4.38 | 91.30 |
| 580 nm | 16.67 | 6.40 | 8.19 | 70.24 | 13.24 | 7.30 | 4.41 | 91.20 |
| 590 nm | 8.40 | 9.20 | 16.31 | 70.79 | 10.31 | 6.86 | 4.43 | 91.11 |
| 600 nm | 9.98 | 13.35 | 28.38 | 71.14 | 8.23 | 6.45 | 4.43 | 91.13 |
| 610 nm | 10.31 | 16.78 | 39.82 | 71.34 | 7.13 | 6.19 | 4.46 | 91.19 |
| 620 nm | 9.94 | 18.33 | 48.64 | 71.50 | 6.68 | 6.10 | 4.47 | 91.28 |
| 630 nm | 10.37 | 20.00 | 55.64 | 71.71 | 6.54 | 6.16 | 4.48 | 91.47 |
| 640 nm | 12.23 | 23.72 | 61.00 | 71.80 | 6.41 | 6.25 | 4.48 | 91.57 |
| 650 nm | 15.46 | 29.46 | 64.33 | 71.91 | 6.41 | 6.46 | 4.49 | 91.64 |
| 660 nm | 20.44 | 37.58 | 66.65 | 71.94 | 6.62 | 6.84 | 4.51 | 91.59 |
| 670 nm | 26.14 | 46.03 | 68.34 | 72.03 | 7.10 | 7.52 | 4.53 | 91.67 |
| 680 nm | 30.96 | 52.63 | 69.29 | 72.10 | 7.68 | 8.47 | 4.54 | 91.66 |
| 690 nm | 34.55 | 57.51 | 70.18 | 72.17 | 8.21 | 9.58 | 4.55 | 91.70 |
| 700 nm | 37.00 | 61.09 | 71.11 | 72.16 | 8.58 | 10.85 | 4.57 | 91.63 |

TABLE 2

Color data of each color patch in the 24-color colorimetric chart

| No. | Color patch object name | L* | a* | b* | C*$_{ab}$ | h$_{ab}$ |
|---|---|---|---|---|---|---|
| 1 | Caucasian skin color | 63.83 | 18.78 | 24.28 | 30.70 | 52.28 |
| 2 | East Asian skin color | 61.42 | 18.13 | 24.13 | 30.18 | 53.08 |
| 3 | South Asian skin color | 55.86 | 17.48 | 23.13 | 28.99 | 52.92 |
| 4 | African skin color | 39.71 | 17.25 | 21.20 | 27.33 | 50.87 |
| 5 | Pork color | 61.04 | 33.43 | 18.43 | 38.17 | 28.87 |
| 6 | Carrot color | 50.36 | 37.93 | 44.91 | 58.78 | 49.82 |
| 7 | Orange color | 60.06 | 31.43 | 56.31 | 64.49 | 60.83 |
| 8 | Aurantius | 70.29 | 19.78 | 66.23 | 69.12 | 73.37 |
| 9 | Banana color | 69.78 | 0.83 | 64.34 | 64.35 | 89.26 |
| 10 | Kelly | 71.09 | −21.22 | 59.26 | 62.94 | 109.70 |
| 11 | Green apple color | 54.24 | −16.38 | 36.54 | 40.04 | 114.15 |
| 12 | Grassland color | 47.13 | −26.45 | 31.94 | 41.47 | 129.63 |
| 13 | Cyan | 70.77 | −31.51 | 8.35 | 32.60 | 165.16 |
| 14 | Smurf color | 65.61 | −19.05 | −24.08 | 30.70 | 231.65 |
| 15 | Blue sky | 53.30 | −4.85 | −29.67 | 30.06 | 260.72 |
| 16 | Lavender color | 43.20 | 12.90 | −27.51 | 30.38 | 295.12 |
| 17 | Purple | 32.27 | 17.92 | −16.73 | 24.52 | 316.97 |
| 18 | Purple cabbage color | 33.72 | 29.51 | −8.18 | 30.62 | 344.51 |
| 19 | Pure red | 40.68 | 48.25 | 27.03 | 55.31 | 29.26 |
| 20 | Pure yellow | 78.56 | 3.17 | 70.41 | 70.48 | 87.42 |
| 21 | Pure green | 50.82 | −40.67 | 18.75 | 44.78 | 155.25 |
| 22 | Pure blue | 42.5 | −10.7 | −30.05 | 31.69 | 251.48 |
| 23 | Black | 24.42 | −0.45 | 3.11 | 3.14 | 98.23 |
| 24 | White | 94.36 | −3.00 | 9.87 | 10.32 | 106.91 |

According to the manufactured color chart, the color of each color patch in the 24-color colorimetric chart was measured by a spectrophotometer, and compared with the theoretical value of the color patch in the formula. The average CIELAB color difference between the measured value of the color patch and the color patch in the formula was set to be less than 2. Through subjective evaluation tests of a plurality of subjects, the present disclosure has a good performance in restoring the preference of memory colors. The design and detection process of the present disclosure is standard, the operability is strong, and the color chart quality criterion is detailed; on the basis of referencing and quoting similar standards, through a large number of experimental comparisons, an object memory color optimization method and an object memory color standard color chart for color correction of capturing device and display device and evaluation of color rendering effect of lighting sources are developed, which fills the blank in this direction. The color chart obtained by the optimization method of the present disclosure can be applied to the evaluation of preferred memory colors on electronic display device, the test of image quality of digital cameras, and the evaluation of color rendering quality of light sources in the lighting industry.

The above embodiment is only a preferred solution of the present disclosure, but it is not intended to limit the present disclosure. Those of ordinary skill in the relevant technical field can make various changes and modifications without departing from the spirit and scope of the present disclosure. Therefore, all technical solutions obtained by equivalent substitution or equivalent transformation shall fall within the scope of protection of the present disclosure.

What is claimed is:

1. A method for acquiring a preferred memory color of an object, comprising the following steps:
- S1, acquiring an original image of a target object and a spectral reflectance distribution curve of a surface color of the target object;
- S2, rendering the original color corrected image to obtain a plurality of experimental images, wherein the color indexes of all experimental images are covered within a set range, and the colors of the experimental images are capable of reflecting the color of the target object;
- S3, acquiring evaluation data of a memory color preference based on the experimental images, wherein the evaluation data comprises a preference rate $P_v$ of a subject for each of the experimental images;
- S4, obtaining a coordinate value of the preferred memory color by using an elliptical memory color model according to the evaluation data, wherein the ellipsoid memory color model is configured to establish a relationship between the evaluation data and the coordinates of memory colors of the experimental images in color space, so as to obtain a preferred memory color ellipsoid, and a center point of the preferred memory color ellipsoid is the coordinate value of the preferred memory color;
- S5, adjusting a color coordinate value of a color patch to be consistent with the coordinate value of the preferred memory color, and adjusting the spectral reflectance distribution curve of the color patch to be consistent with a shape characteristic of the spectral reflectance distribution curve of the surface color of the target object; and
- S6, taking the color of the color patch as the acquired preferred memory color of the target object.

2. The method according to claim 1, wherein the original image is a captured image or an existing image, the light environment presented by the existing image is a D65 standard light source, an illumination source for the captured image during capturing is a D65 standard light source, the illumination source is perpendicular to the surface of the target object, capturing light and a plane where the target object is located are at an angle of 45°, and a camera is in a manual mode.

3. The method according to claim 1, wherein in step S3, the evaluation data is obtained by conducting a psychophysical experiment test on the subject.

4. The method according to claim 1, wherein the spectral reflectance distribution curve is measured by a contact spectrophotometer.

5. The method according to claim 1, wherein in step S3, the experimental images are displayed to the subject through a display device, and the display device has been corrected by using a three-dimensional color lookup table method.

6. The method according to claim 1, wherein in step S2, an average value of pixel colors of the target object is taken as a rendering starting point of the original image, and a rendering process is performed on the original image.

7. The method according to claim 1, wherein the elliptical memory color model comprises Formula (1) and Formula (2), the Formula (1) is $$P_c = \frac{1}{1 + e^{(\Delta E' - a)}} \quad (1)$$

the Formula (2) is $$\Delta E' = \sqrt{\begin{array}{l} k_1(L^* - L_0^*)^2 + k_2(a^* - a_0^*)^2 + k_3(b^* - b_0^*)^2 + \\ k_4(L^* - L_0^*)(a^* - a_0^*) + k_5(L^* - L_0^*)(b^* - b_0^*) + \\ k_6(a^* - a_0^*)(b^* - b_0^*) \end{array}} \quad (2)$$

where $P_c$ is a calculated preference rate obtained through the evaluation data; $\Delta E'$ is a color difference between the preferred memory color and a color in the experimental images; a parameter $\alpha$ is a $\Delta E'$ value corresponding to a preference rate of 50%; $k_1$, $k_2$, $k_3$, $k_4$, $k_5$ and $k_6$ represent parameters corresponding to the elliptic memory color model, respectively; $L^*_0$, $a^*_0$ and $b^*_0$ represent the coordinates of the preferred memory color in a CIELAB color space; $L^*$, $a^*$ and $b^*$ represent the coordinates of the memory color in the CIELAB color space in the experimental images; and wherein a correlation coefficient R is calculated by using the calculated preference rate $P_c$ obtained by the Formula (1) and the preference rate $P_v$, and a value of R is maximized to obtain coefficients in the Formula (1) and the Formula (2).

8. The method according to claim 1, wherein the color indexes comprise a lightness $L^*$, a red-green $a^*$, a yellow-blue $b^*$, a chroma $C^*_{ab}$, a hue angle $h^*_{ab}$ and a spectral reflectance distribution curve in the CIELAB color space.

9. A standard color chart of a preferred memory color, wherein a color patch to be optimized in a target color chart is optimized according to the method of claim 1, and the preferred memory color obtained after optimization is taken as the color of the color patch.

* * * * *